United States Patent [19]

Camps et al.

[11] Patent Number: 5,097,460
[45] Date of Patent: Mar. 17, 1992

[54] CENTERING DETECTION UNIT FOR A DISC-RECORD PLAYER

[75] Inventors: Libert H. A. M. Camps, Hasselt, Belgium; Petrus L. A. Rouws; Omar P. L. P. Van Heusden, Hasselt, Belgium

[73] Assignee: U. S. Philips Corporation, New York, N.Y.

[21] Appl. No.: 630,683

[22] Filed: Dec. 20, 1990

[30] Foreign Application Priority Data

Dec. 20, 1989 [NL] Netherlands .................. 8903114

[51] Int. Cl.⁵ ............... G11B 25/04; G11B 17/04; G11B 17/022; G11B 33/02
[52] U.S. Cl. ........................... 369/77.1; 369/75.2; 369/194; 369/292
[58] Field of Search .............. 369/75.2, 77.1, 77.2, 369/292, 194, 195; 360/99.02, 99.03, 99.06, 99.07

[56] References Cited

U.S. PATENT DOCUMENTS

| | | | |
|---|---|---|---|
| 4,498,162 | 2/1985 | Schatteman | 369/194 X |
| 4,523,306 | 6/1985 | Staar | 369/292 X |
| 4,674,079 | 6/1987 | Agostini | 369/292 X |
| 4,969,140 | 11/1990 | Koiwa et al. | 369/75.2 X |

Primary Examiner—Stuart S. Levy
Assistant Examiner—Tan Nguyen
Attorney, Agent, or Firm—David R. Treacy

[57] ABSTRACT

A disc-record player for recording and/or reading information on/from disc-shaped information carriers, in particular optical discs, of different diameter includes a frame, a turntable for the information carriers, and a device for moving said information carriers and bringing them into a well-defined position relative to the turntable. At least one positioning member is movable transversely of a loading direction; the positioning member is constructed as a pivotal arm and includes a positioning element adapted to cooperate with the information carriers, and a detection unit for detecting the position of the information carriers. The detection unit includes a slide member movable in the loading direction of the information carriers and in an opposite direction, a guide element connected to the positioning member and cooperating with a guiding edge of the slide member, a rotary member movable about an axis of rotation and having a detection element for cooperation with the circumferential edge of the information carriers, and a servo element. The guide element is arranged on the rotary member, which is rotatably supported on the positioning member, the guide element being situated adjacent a straight line passing through the axis of rotation and the detection element, and the servo element being arranged on the slide member.

8 Claims, 2 Drawing Sheets

CENTERING DETECTION UNIT FOR A DISC-RECORD PLAYER

BACKGROUND OF THE INVENTION

1. Field of the Invention

This invention relates to a disc-record player comprising a device for scanning disc-shaped information carriers of mutually different diameters, comprising a frame, a turntable comprising a supporting surface for information carriers having a circumferential edge, a device for moving said information carriers in a loading direction and bringing said information carriers in a well-defined position relative to the turntable, which device comprises at least one positioning member which is movable transversely of the loading direction and is constructed to cooperate with the circumferential edges of said information carriers, a detection unit for detecting the position of said information carriers, which detection unit comprises a sliding member which is movable in said loading direction of said information carriers and in a direction opposite thereto, a guide element which is connected to said positioning member and which cooperates with a guiding edge of the sliding member, and a rotary member which is movable about an axis of rotation and which comprises a detection element constructed for cooperation with the circumferential edges of said information carriers, and a servo element.

The invention also relates to a detection unit for use in the disc-record player.

2. Description of the Related Art

U.S. Pat. No. 4,470,136 (herewith incorporated by reference) discloses a disc-record player comprising a loading mechanism for moving phonograph records of different diameters into and out of the player. The loading mechanism comprises two parallel slidable positioning members each comprising a positioning element for cooperation with the circumferential edge of a disc-record to be positioned. The positioning members are coupled to one another by means of a gear wheel and are movable transversely of the loading direction of the records and in opposite directions relative to one another. The loading mechanism further comprises a slide member, which is movable in the loading direction and which has a profiled guiding edge, and a locking plate which is movable transversely of the record-loading direction. One of the positioning members comprises a pin which cooperates selectively with the guiding edge of the slide member and with the locking plate. The loading mechanism further comprises an arm which is rotatable about a fixed axis of rotation and which has a detection element for cooperation with the circumferential edge of the disc record to be positioned, the rotatable arm comprising a pin engaging a guide slot in the slide member. The mechanism is constructed in such a manner that at the end of the loading movement of a disc record, which record has been centred, an actuator element secured to the locking plate actuates a microswitch to stop the loading movement. In the prior-art disc-record player the device for successively moving the disc records in the loading direction, centring said records and detecting the centred position of said records comprises a comparatively large number of parts and its construction and operation are intricate.

SUMMARY OF THE INVENTION

It is an object of the invention to provide a disc-record player comprising a device for recording and/or reading information on/from disc-shaped information carriers, in particular optical discs, of different diameters and comprising a device for moving the information carriers in a loading direction and bringing them in a well-defined position, the disc-record player comprising a detection unit for detecting the position of the information carriers, which unit comprises a small number of parts.

To this end the disc-record player in accordance with the invention is characterized in that the guide element is arranged on the rotary member which is rotatably supported on the positioning member, the guide element being situated adjacent a straight line passing through the axis of rotation and the detection element and the servo element being arranged on the slide member. The disc-record player thus obtained can be manufactured cheaply and simply and yet comprises an effective low-noise mechanical detection unit in which only minimal frictional forces occur. The detection unit can have a small height. This makes the disc-record player in accordance with the invention very suitable as a built-in apparatus, for example in the dashboard of a car. Another advantage of the disc-record player in accordance with the invention is that in the case of a suitable dimensioning and choice of materials the detection unit, which comprises a small number of parts, does not suffer from annoying vibrations, which is of particular importance in automotive uses.

A practical embodiment of the disc-record player in accordance with the invention is characterized in that the positioning member is constructed as a pivotal arm which is movable about a pivotal axis parallel to the axis of rotation of the rotary member, the guiding edge of the slide member comprising at least two areas which are disposed at least substantially on a circle whose centre is situated substantially on the pivotal axis of the pivotal arm. This disc-record player is suitable for scanning information carriers of an in principle unlimited number of diameters.

An embodiment of the disc-record player in accordance with the invention is characterized in that the axis of rotation of the rotary member at least substantially coincides with a central axis of the positioning element of the positioning member. The advantage of this practical embodiment mainly resides in the very small number of parts it requires.

An embodiment comprising a detection unit which operates very effectively is characterized in that the line passing through a axis of rotation of the rotary member and the detection element, extends at least substantially perpendicularly to a line passing through the axis of rotation and the guide element. An advantage of this embodiment is the optimum sensitivity of the detection unit to changes in the position of a disc as a result of the substantial displacement of the slide member as a function of the rotation of the rotary member as the disc moves into or out of the player.

BRIEF DESCRIPTION OF THE DRAWINGS

The invention will now be described in more detail, by way of example, with reference to the drawings in which.

DETAILED DESCRIPTION OF THE PREFERRED EMBODIMENT

Figure 1:
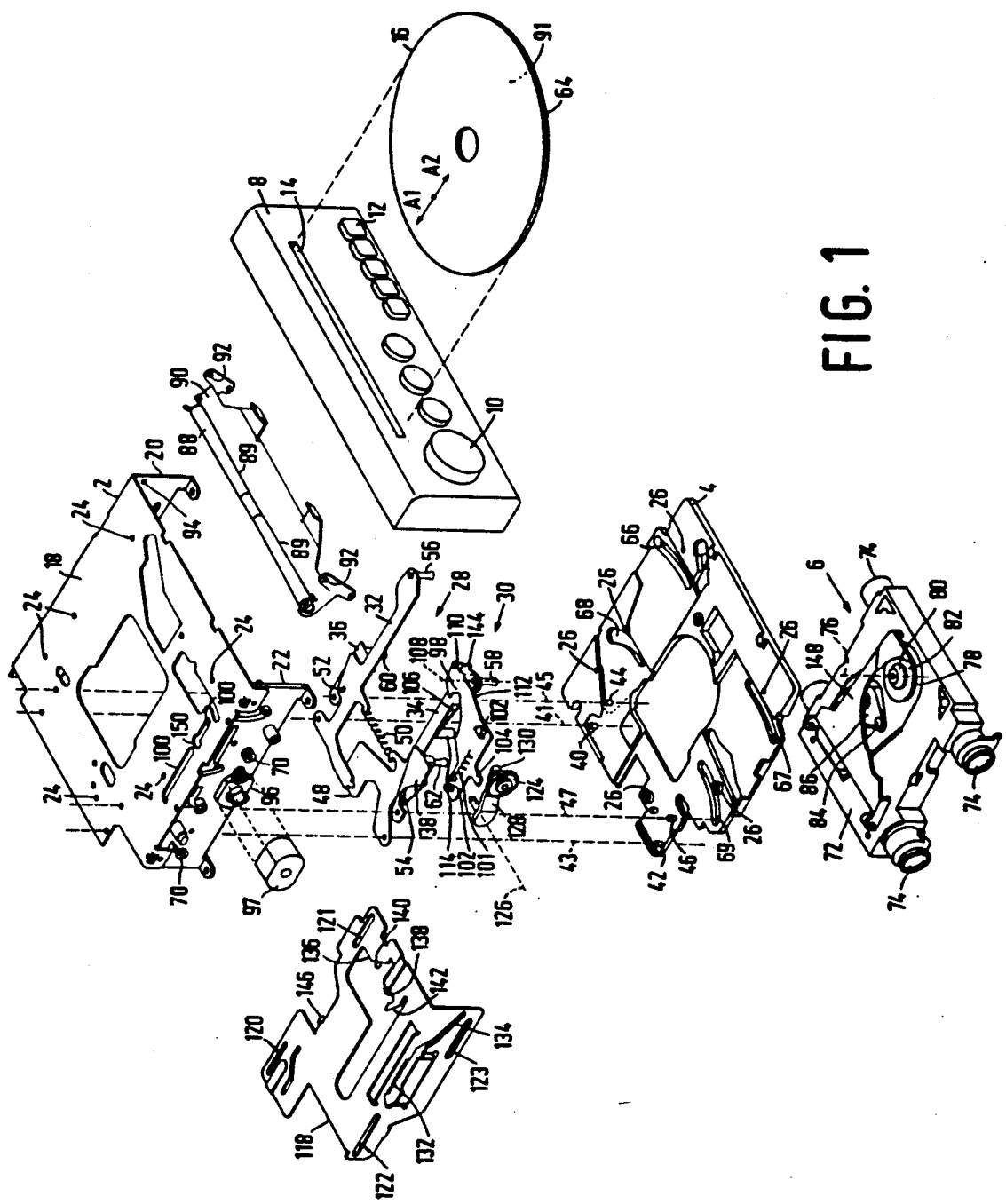
FIG. 1 is an exploded view showing a disc-record player in accordance with the invention, comprising a detection unit for detecting the position of information carriers.

The disc-record player in accordance with the invention shown in FIG. 1 is suitable for inscribing and/or reading optical information carriers such as CDs and CD-singles. The disc-record player comprises a housing 2 that is made in part of metal, a flat plastics frame 4 secured in the housing 2, and an optical scanning device 6 secured in the housing 2. The housing 2 is arranged in a casing of which only a front wall 8 is shown. The front wall 8, which carries control knobs and keys 10 and 12, is formed with a slot 14 for moving an optical disc 16, for example a CD, into and out of the player in a loading direction A1 and an unloading direction A2 respectively.

The housing 2 comprises a main wall 18 and two side walls 20 and 22. The main wall 18 is formed with six holes 24, which correspond to six holes 26 in the frame 4. The frame 4 is secured to the inner side of the main wall 18 of the housing 2 by means of bolts passed through the holes 24 and 26.

The disc-record player shown in FIG. 1 further comprises a detection unit 30 for detecting the position of the information carriers, which detection unit is connected to a device 28 for moving a CD or CD-single in a loading direction A1 and bringing said disc into a well-defined position. The last-mentioned device is referred to hereinafter as positioning device. The positioning device 28 comprises a pair of pivotable positioning members 32 and 34 and a pair of pivotable positioning members 36 and 38. The positioning members 32 and 34 are supported on the frame 4 by means of journals 40 and 42 so as to be pivotable about pivotal axes 41 and 43 respectively. The second positioning members 36 and 38 are supported on the frame 4 by means of journals 44 and 46 respectively so as to be pivotable about pivotal axes 45 and 47 respectively. A tension spring 50 is arranged between the positioning members 32 and 34, which are constructed as pivotal arms and which are movably coupled to each other by means of a pin-slot linkage 48. The positioning members 36 and 38, which are also constructed as pivotal arms, are movably coupled to the positioning members 32 and 34 respectively by means of two pin-slot linkages 52 and 54. The positioning members 32 and 34 comprise a positioning element 56 and 58 respectively and the positioning members 36 and 38 comprise further positioning elements 60 and 62. The positioning elements 56, 58, 60 and 62, which are adapted to cooperate with a circumferential edge 64 of an optical disc, may be constructed as cylindrical rollers or pins but preferably have a conical or double conical shape, the central axes of the positioning elements 56, 58, 60 and 62 extending parallel to the pivotal axes 41, 43, 45 and 47. The frame 4 is formed with four slots 66, 67, 68 and 69 through which the positioning elements 56, 58, 60 and 62 project to allow them to cooperate with the circumferential edge 64 of an optical disc.

The optical scanning device 6, which is of a type known per se, for example as disclosed in U.S. Pat. No. 4,403,316 (herewith incorporated by reference), is connected to the housing 2 by means of four pins passed through holes 70 in the side walls 20 and 22 of the housing 2 and a mounting plate 72 with four resilient damping elements 74. The scanning device 6 comprises a turntable 78 which is rotatable about an axis of rotation 76 and which comprises a centring mandrel 80 and a supporting surface 82 for an optical disc. The axis of rotation 76 extends parallel to the mutually parallel first and second pivotal axes 41, 43, 45 and 47. The scanning device 6 further comprises a scanning unit 84, which comprises an objective and which in the present example is secured to a pivotal arm 86.

An optical disc 16 inserted into the opening 14 in the front wall 8 is positioned between the positioning elements 56, 58, 60 and 62 and above the turntable 78 of the scanning device 6 by means of appropriate parts of the positioning device 18. In the present example the device 28 comprises a disc drive roller 88, which is rotatably journalled in a pivotable roller holder 90. The roller holder 90 has two holes 92 which correspond to two holes 94 in the side walls 20 and 22 of the housing 2, the roller holder 90 being supported by means of two trunnions extending through the holes 92 and 94. The roller 88, which is known per se from European Patent Application 0,296,829 (herewith incorporated by reference), is driven by means of an electric motor 97 via a gear-wheel transmission, not shown, said motor being secured to a mounting portion 96 of the side wall 22 of the housing 2. During introduction of an optical disc 16 two slightly conical circumferential surfaces 89 of the roller 88 cooperate with a radial surface 91 of the optical disc, the optical disc then being situated between the roller 88 and the frame 4 and consecutively coming into contact with the positioning elements 56 and 58 and the positioning elements 60 and 62. The loading movement ceases once the optical disc has assumed the desired position.

Figure 2:
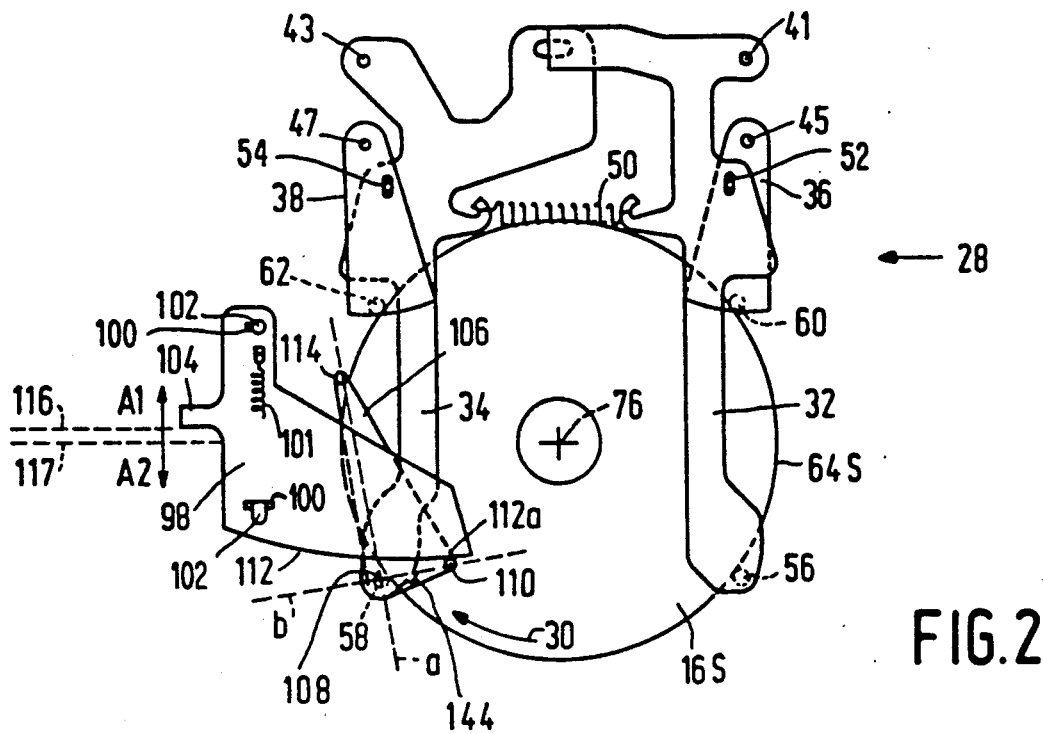
FIG. 2 is a plan view showing the centring device with a CD-single in a centred position.

FIG. 2 shows a situation in which a CD-single, referenced 16S and having a diameter of 8 cm, is brought into a desired position by means of the positioning device 28. In the disc-record player in accordance with the invention this position is dictated by the location of the turntable 78, so that the central axis of the disc coincides with the axis of rotation 76 of the turntable 78. In this position, also referred to as centred position, the disc 16S is clamped between the positioning elements 56, 58, 60 and 62. The positioning elements 56, 58, 60 and 62, which engage against the circumferential edge 64S of the disc 16S, are disposed on a circle whose centre is situated on the axis of rotation 76. The circle consequently corresponds to the circumferential edge 64S of the CD-single and has a diameter of 8 cm.

Figure 3:
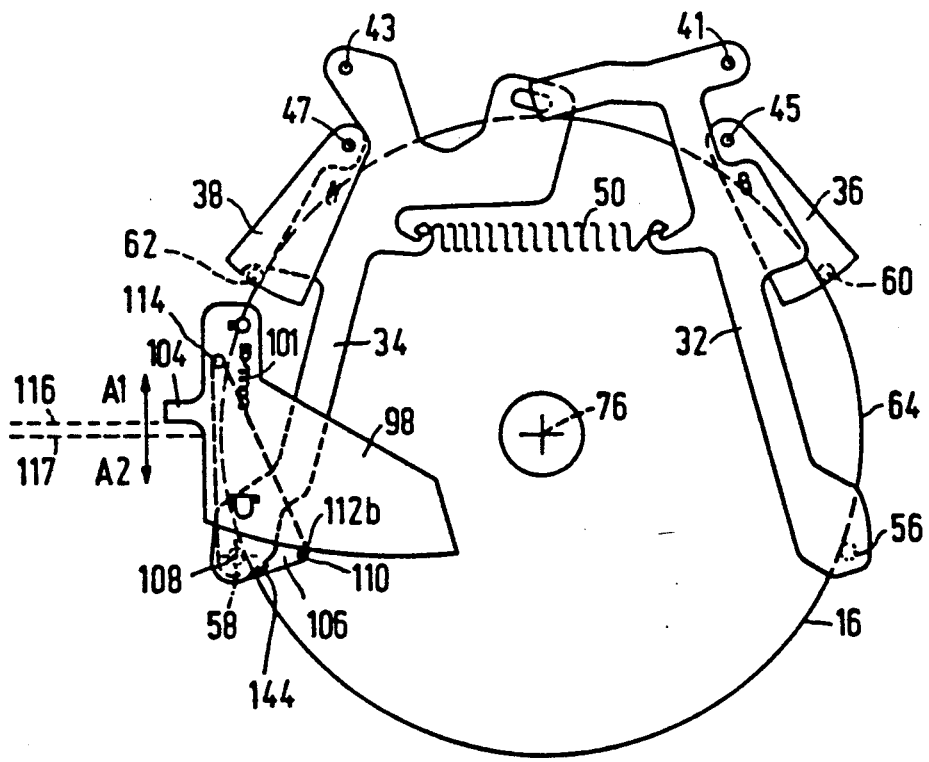
FIG. 3 is a plan view showing the centring device with a CD in a centred position.

In the situation illustrated in FIG. 3 a CD, bearing the reference numeral 16, is in the centred position, in which the central axis of the disc coincides with the axis of rotation 76 of the turntable. In this situation the positioning elements 56 and 58 and the positioning elements 60 and 62 are all situated on a circle whose centre is situated on the axis of rotation 76. This circle corresponds to the circumferential edge 64 of the CD and has a diameter of 12 cm. In the situation shown in FIG. 3, the positioning members 32 and 34 and the positioning members 36 and 38, as is apparent from the drawings, have been pivoted apart through a specific angle about their respective pivotal axes 41, 43, 45 and 47 in comparison with the situation shown in FIG. 2.

The detection unit 30 of the disc-record player in accordance with the invention shown in FIG. 1 is intended for detecting the position, in particular the centred position, of an optical disc loaded into the player and comprises a slide member 98 which is movable in the loading direction A1 and in the opposite unloading direction A2. The slide member 98 is supported to be slidable relative to the housing 2 by means of two trunnions 102 which engage slots 100 in the housing. A helical spring 101 is arranged between the slide member 98, which is provided with a servo-element 104, and the housing 2. The detection unit 30 further comprises a rotary member 106 which is rotatable about an axis of rotation 108 and which is supported on the positioning member 34. The axis of rotation 108 coincides with the central axis of the positioning element 58 and extends parallel to the pivotal axis 43 of the positioning member 34. The rotary member 106 comprises a guide element 110 in the form of a projection or pin for cooperation with a guiding edge 112 of the slide member 98. The guiding edge 112 has at least two areas 112a and 112b (see FIGS. 2 and 3 respectively) which are situated approximately on a circle whose centre is situated near the pivotal axis 43. The rotary member 106 carries a detection element 114 constructed as a pin or roller for cooperation with the circumferential edge 64 or 64S of an optical disc 16 or 16S which has been loaded into the disc-record player. The rotary member has such a shape that the straight line a through the axis of rotation 108 and the detection element 114 extends at an angle of substantially 90° relative to the straight line b through the axis of rotation 108 and the guide element 110 (see FIG. 2). For design reasons said angle may be made slightly larger or smaller than 90° without departing from the inventive principle.

The operation of the detection unit 30 will be described in detail with reference to FIGS. 2 and 3. As already mentioned, FIG. 2 illustrates the situation in which a CD-single 16S is in the centred position, which is related to the position of the turntable 78 and in which the central axis of the disc 16S coincides with the axis of rotation 76 of the turntable 78. The rotary member 106 of the detection unit 30 occupies such a position that the detection element 114 engages against the circumferential edge 64S of the disc. When the disc 16S is moved to the centred position the sliding member is moved against the action of the spring 101 in a direction parallel to the loading direction A1 as a result of the cooperation between the guide element 110 and the guiding edge 112, in particular the portion 112a. The special construction of the detection unit 30 in accordance with the invention ensures that the servo element 104 passes a pre-defined marking line 116 on the frame 4 exactly at the instant at which an inserted optical disc reaches the centred position. If there is no disc in the disc-record player the servo element 104 is situated at the location of the broken line 117.

As stated hereinbefore, FIG. 3 illustrates the situation in which a Compact Disc 16 is in the desired centred position. Since the diameter of the disc 16 is larger than that of the disc 16S the positioning members 32 and 34 and the positioning members 36 and 38 are spread further apart than in the situation illustrated in FIG. 2. As a result of the displacement of the positioning member 34 the axis of rotation 108 of the rotary member 106 is moved sideways and as a result of the larger disc diameter the detection element 114 is also moved sideways. As a result of these movements the guide element 110 has moved to the area 112b of the guiding edge 112, the slide member 98 being moved in the direction A1. In the position shown, in which the disc 16 is exactly in the centred position, the servo element 104 is again situated exactly on the marking line 116. The orientation of the rotary member 106 in FIG. 3 is substantially the same as the orientation of the rotary member in FIG. 2.

The disc-record player shown in FIG. 1 comprises a command element 118 which is supported on the housing 2 so as to be movable in the directions A1 and A2. For this purpose the command element 118 has four guide slots 120, 121, 122 and 123 engaged by guide pins on the main wall 18 and the side wall 22 of the housing 2. The command element 118 is driven by the electric motor 97 via a gear wheel transmission. The gear wheel transmission comprises a gear wheel 124. The gear wheel 124 is arranged on a tilting arm 128 which is movable about a pivotal axis 126 and is supported in the side wall 22 of the housing 2. The tilting arm 128 has a surface 130 for cooperation with the servo element 104 of the detection unit 30. During loading of an optical disc the tilting arm 128 is pressed against the servo element 104 at the location of the surface 130 under the influence of friction or spring force. However, when an optical disc reaches the defined or centred position the servo element clears the surface 130 as a result of the movement of the slide member 98 in the direction A1 and the tilting arm is tilted until the gear wheel 124 meshes with a gear rack 132 of the command element 118, so that a mechanical coupling is established between the motor 97 and the command element 118. After said tilting of the tilting arm 128 the drive of the disc drive roller 88 is stopped via a mechanism which is shown only partly.

The command element 118 has an inclined slot 134 which is engaged by a spindle, not shown, of a mechanism which is coupled to the roller holder 90. The command element 118 further comprises two peripheral portions 136 and 138 for cooperation with the guide element 110, the guide element 110 being situated at the location of the peripheral portion 136 in the centred position of a CD-single and the guide element 110 being situated at the location of the peripheral portion 138 in the centred position of a CD. The command element 118 further comprises two inclined edges 140 and 142 for cooperation with a tag or projection 144 of the rotary member 106, the projection 114 being situated at the location of the inclined edge 140 in the centred position of a CD-single and the projection 144 being situated at the location of the inclined edge 142 in the centred position of a CD. A lateral edge of the command element 118 further carries an actuating projection 146 for cooperation with a disc-pressure member 148. If after centring of an optical disc 16 or 16S the command element 118 is coupled to the drive motor 97 by tilting of the tilting arm 128 the positioning elements 56 and 58, the positioning elements 60 and 62, the detection element 114 and the roller 88 are moved to a desired distance from the disc during the movement of the command element in the direction A1, and the disc-pressure member 148 presses the disc against the supporting surface 82 of the turntable 78.

In order to remove an optical disc from the turntable and move it outwards the command element is moved in the direction indicated by the arrow A2 by means of the motor 97, the spring 50 arranged between the positioning members 32 and 34 and the spring 101 arranged between the sliding member 98 and an edge portion 150 of the housing 2 ensuring that all the positioning elements 56, 58, 60 and 62 and the detection element 114 are moved towards the disc circumference. The spring 50 then provides enough spring force to move the disc lying on the turntable so far along the axis of rotation 76 of the turntable 78 by means of the double conical positioning elements 56, 58, 60 and 62 that the disc can be moved outwards over the centring cone 80 when the roller is driven in the appropriate direction. If desired, the last-mentioned function of the positioning elements may be performed by the roller 88 which is situated underneath the disc and which moves upwards.

It will be appreciated that the invention is not limited to the embodiment shown in the drawings. For example, disc-record players constructed to scan more than two discs of different diameters and disc-record players constructed to inscribe and/or read two discs of diameters other than those mentioned in the example also fall within the scope of the invention.

We claim:

1. A disc-record player comprising a device for scanning disc-shaped information carriers of mutually different diameters, comprising a frame, a turntable comprising a support surface for information carriers having a circumferential edge, a device for moving said information carriers to a loading direction and bringing said information carriers in a well-defined position relative to the turntable, which device comprises at least one positioning member, an end of which is movable transversely of the loading direction and which is constructed to cooperate with the circumferential edges of said information carriers, a detection unit for detecting the position of said information carriers, which detection unit comprises a sliding member which is movable in said loading direction of said information carriers and in a direction opposite thereto, a guide element which is connected to said positioning member and which cooperates with a guiding edge of the sliding member, and a rotary member which is movable about an axis of rotation and which comprises a detection element constructed for cooperation with the circumferential edges of said information carriers, and a servo element, in which the guide element is situated adjacent a straight line passing through the axis of rotation and the detection element, and the servo element is arranged on the slide member.

2. A disc-record player as claimed in claim 1, characterized in that the positioning member is constructed as a pivotal arm which is movable about a pivotal axis parallel to the axis of rotation of the rotary member, the guiding edge of the slide member comprising at least two areas which are disposed at least substantially on a circle whose centre is situated substantially on the pivotal axis of the pivotal arm.

3. A disc-record player as claimed in claim 1, characterized in that the axis of rotation of the rotary member at least substantially coincides with a central axis of the positioning element of the positioning member.

4. A disc-record player as claimed in claim 1, characterized in that the line passing through the axis of rotation of the rotary member and the detection element extends at least substantially perpendicularly to a line passing through the axis of rotation and the guide element.

5. A detection unit for detecting the position of information carriers in a disc-record player that includes a positioning member, which detection unit comprises:
   a sliding member which is movable in a loading direction of said information carriers and in a direction opposite thereto;
   a guide element which is connected to said positioning member and which cooperates with a guiding edge of the sliding member; and
   a rotary member which is movable about an axis of rotation and which comprises a detection element constructed for cooperation with the circumferential edges of said information carriers, and a servo element, in which the guide element is situated adjacent a straight line passing through the axis of rotation and the detection element, and the servo element is arranged on the slide member.

6. A detection unit as claimed in claim 5, in which the positioning member is constructed as a pivotal arm which is movable about a pivotal axis parallel to the axis of rotation of the rotary member, and the guiding edge of the sliding member comprises at least two areas which are disposed at least substantially on a circle whose centre is situated substantially on the pivotal axis of the pivotal arm.

7. A detection unit as claimed in claim 5, characterized in which the axis of rotation of the rotary member at least substantially coincides with a central axis of the positioning element of the positioning member.

8. A detection unit as claimed in claim 5, characterized in which the line passing through the axis of rotation of the rotary member and the detection element extends at least substantially perpendicularly to a line passing through the axis of rotation and the guide element.

* * * * *